United States Patent
Jansson (10) Patent No.: US 12,033,483 B2
(45) Date of Patent: Jul. 9, 2024

(54) FLAME DETECTING ARRANGEMENT

(71) Applicant: Firefly AB, Stockholm (SE)

(72) Inventor: Lennart Jansson, Värmdö (SE)

(73) Assignee: Firefly AB, Stockholm (SE)

( * ) Notice: Subject to any disclaimer, the term of this patent is extended or adjusted under 35 U.S.C. 154(b) by 0 days.

(21) Appl. No.: 17/439,535

(22) PCT Filed: Mar. 13, 2020

(86) PCT No.: PCT/EP2020/056932
§ 371 (c)(1),
(2) Date: Sep. 15, 2021

(87) PCT Pub. No.: WO2020/187775
PCT Pub. Date: Sep. 24, 2020

(65) Prior Publication Data
US 2022/0157140 A1    May 19, 2022

(30) Foreign Application Priority Data
Mar. 20, 2019   (SE) .................... 1950346-5

(51) Int. Cl.
*G08B 17/12*    (2006.01)
*G01J 5/00*    (2022.01)
(Continued)

(52) U.S. Cl.
CPC .......... *G08B 17/125* (2013.01); *G01J 5/0018* (2013.01); *G06T 7/70* (2017.01); *G08B 29/046* (2013.01); *G08B 29/18* (2013.01)

(58) Field of Classification Search
None
See application file for complete search history.

(56) References Cited

U.S. PATENT DOCUMENTS

| 9,924,160 B1 * | 3/2018 | Kresch .................. G01J 5/10 |
| 2005/0128093 A1 * | 6/2005 | Genova ............... G08B 29/183 |
| | | 340/568.1 |

(Continued)

FOREIGN PATENT DOCUMENTS

| CN | 101334924 A | 12/2008 |
| CN | 103124990 A | 5/2013 |

(Continued)

OTHER PUBLICATIONS

International Search Report and Written Opinion dated Jun. 26, 2020 for PCT/EP2020/056932.

(Continued)

*Primary Examiner* — Rebecca A Volentine
(74) *Attorney, Agent, or Firm* — Faegre Drinker Biddle & Reath LLP (57) ABSTRACT

In accordance with one or more embodiments herein, a flame detecting arrangement 100 is provided. The flame detecting arrangement 100 comprises: at least one optical flame detector 110, arranged with its field-of-view covering a predetermined area; at least one movement sensor 120, arranged together with the at least one flame detector 110; and at least one processing device 180 arranged together with the at least one flame detector 110. The at least one processing device 180 is arranged to: receive signals from the movement sensor 120; detect abnormal movement of the flame detector 110 based on these signals; and alert an operator and/or a control system 200 if abnormal movement of the flame detector 110 has been detected. This enables the field-of-view of the flame detector to be corrected to the desired, preferably the original, field-of-view.

16 Claims, 3 Drawing Sheets

(51) Int. Cl.
*G06T 7/70* (2017.01)
*G08B 29/04* (2006.01)
*G08B 29/18* (2006.01)

(56) References Cited

U.S. PATENT DOCUMENTS

| | | |
|---|---|---|
| 2007/0230798 A1 | 10/2007 | Naylor et al. |
| 2007/0247526 A1 | 10/2007 | Flook et al. |
| 2008/0272921 A1 | 11/2008 | Cole |
| 2010/0259612 A1 | 10/2010 | Lars et al. |
| 2012/0126700 A1* | 5/2012 | Mayfield .............. H05B 47/105 315/86 |
| 2013/0207807 A1 | 8/2013 | Popper |
| 2016/0203694 A1 | 7/2016 | Hogasten et al. |
| 2017/0104979 A1* | 4/2017 | Shaw .................... H04N 13/239 |
| 2017/0205282 A1 | 7/2017 | Liang et al. |
| 2018/0316867 A1 | 11/2018 | Mathur et al. |
| 2019/0017865 A1* | 1/2019 | Barcelos .............. G08B 29/043 |
| 2020/0271524 A1 | 8/2020 | Jansson |
| 2021/0287524 A1* | 9/2021 | Hermann .............. G08B 29/183 |

FOREIGN PATENT DOCUMENTS

| | | |
|---|---|---|
| CN | 103493112 A | 1/2014 |
| CN | 104767965 A | 7/2015 |
| CN | 205608549 U | 9/2016 |
| CN | 107884076 A | 4/2018 |
| CN | 108369764 A | 8/2018 |
| CN | 108896169 A | 11/2018 |
| CN | 109374128 A | 2/2019 |
| EP | 1 936 576 A1 | 6/2008 |
| EP | 3428897 A1 | 1/2019 |
| FR | 2 702 069 A1 | 9/1994 |
| JP | 2006-293646 A | 10/2006 |
| WO | WO-2017065808 A1 | 4/2017 |

OTHER PUBLICATIONS

Office Action dated Apr. 20, 2022 issued in U.S. Appl. No. 16/648,749 with double-patenting rejections on pp. 4-6.
Written Opinion of the International Searching Authority and International Search Report dated Oct. 24, 2018 issued in international application No. PCT/EP2018/074801.
U.S. Appl. No. 16/648,749, filed Mar. 19, 2020, Lennart Jansson.

* cited by examiner

FLAME DETECTING ARRANGEMENT

CROSS REFERENCE TO RELATED APPLICATIONS

This application is a national stage entry of International Application No. PCT/EP2020/056932 filed Mar. 13, 2020, which claims benefit of Swedish Patent Application No. 1950346-5 filed Mar. 20, 2019, both of which are herein incorporated by reference in their entirety.

TECHNICAL FIELD

The present disclosure relates generally to flame detecting arrangements and methods.

BACKGROUND

There are many different types of optical flame detectors that can be arranged to detect the presence of flames in an area to be surveilled within the field-of-view of the flame detector. Common varieties are e.g. ultraviolet flame detectors, such as Omniguard® model 660, infrared flame detectors, such as Omniguard® model 760, and ultraviolet-infrared flame detectors, such as Omniguard® model 860. Ultraviolet flame detectors detect ultraviolet radiation from the surveilled area, infrared flame detectors detect infrared radiation from the surveilled area, and ultraviolet-infrared flame detectors detect both types of radiation from the surveilled area.

An optical flame detector may typically be mounted with its field-of-view covering an area where there is a fire hazard, such as e.g. a turbine enclosure, a generator room, a munitions facility, a battery room, a gas cabinet, an aircraft hangar, a fuel transfer station, a hydrogen storage and filling facility, a compressor station, a silane storage bunker, or a paint spray booth. Optical flame detectors may be capable of detecting both hydrocarbon (e.g. gasoline, propane, methane, alcohol) and non-hydrocarbon (e.g. hydrogen, silane, hydrazine, magnesium) flames. However, once an optical flame detector has been arranged with its field-of-view covering an area where there is a fire hazard, there is no way of knowing that the surveilled area stays within the field-of-view of the optical flame detector. This may mean that the optical flame detector cannot be relied upon to safely monitor an area to be surveilled for the presence of flames.

US2005128093 describes a self-protected fire-sensing system that includes a tamper sensor for detecting movement to the system.

EP3428897 describes an optical flame detector comprising a magnetometer, an accelerometer, and a gyroscope, in a system which also comprises an information handling system configured to obtain orientation data from the magnetometer, the accelerometer, and the gyroscope.

PROBLEMS WITH THE PRIOR ART

In the system described in US2005128093, the tamper sensor simply determines whether there is movement. There is no processing of the signals from the tamper sensor in any processing device, in order to determine whether the detected movement is abnormal. This means that the tamper sensor will detect tampering as soon as there is any kind of movement to the system.

In the system described in EP3428897, there is no local processing in the optical flame detector. This means that the optical flame detector must have a continuous connection with the information handling system, so that all signals from the magnetometer, the accelerometer, and the gyroscope can be processed there. This also means that it is not possible to integrate any functionalities that need to function without such a continuous connection locally in the optical flame detector.

There is thus a need for an improved flame detecting arrangement.

SUMMARY

The above described problem is addressed by the claimed flame detecting arrangement, which may comprise: at least one optical flame detector, arranged with its field-of-view covering a predetermined area; at least one movement sensor, arranged together with the at least one flame detector; and at least one processing device, arranged together with the flame detector. The at least one processing device may be arranged to: receive signals from the movement sensor; detect abnormal movement of the flame detector based on these signals; and alert an operator and/or a control system if abnormal movement of the flame detector has been detected. Such a flame detecting arrangement may ensure that an operator/control system is informed if there is a risk that the field-of-view of the flame detector to no longer covers the predetermined area to be surveilled. This enables the field-of-view of the flame detector to be corrected to the desired, preferably the original, field-of-view.

The above described problem is further addressed by the claimed method for an optical flame detector arranged with its field-of-view covering a predetermined area. The method may comprise: receiving signals from a movement sensor arranged together with the flame detector in a processing device arranged together with the flame detector; detecting abnormal movement of the flame detector based on these signals; and alerting an operator and/or a control system if abnormal movement of the flame detector has been detected. Such a method may ensure that an operator/control system is informed if there is a risk that the field-of-view of the flame detector no longer covers the predetermined area to be surveilled. This enables the field-of-view of the flame detector to be corrected to the desired, preferably the original, field-of-view.

The at least one movement sensor is preferably arranged together with the at least one flame detector, so that it senses the same movement as the at least one flame detector. The at least one movement sensor may e.g. be arranged within, or mounted onto, the same housing as the at least one flame detector.

The at least one processing device is preferably a local processing device arranged together with the flame detector. Such a local processing device may e.g. be arranged within, or mounted onto, the same housing as the flame detector. If such a local processing device is used, the signals from the at least one movement sensor may be processed locally, so that there is no need to send any signals to any remote processing device unless abnormal movement is detected. This enables the flame detecting arrangement to function as a stand-alone device, without any connection to any external system. However, the at least one processing device may also be a combination of a local processing device with a remote processing device, e.g. in a control system.

In embodiments, the at least one movement sensor comprises a vibration sensor. Abnormal movement of the flame detector may be detected based on signals received from this vibration sensor. This allows for detecting any kind of abnormal movement of the flame detector, even e.g. a mild push or shake, that may have caused the field-of-view of the flame detector to no longer cover the predetermined area.

In embodiments, an operator and/or a control system is alerted if abnormal movement in the form of vibrations beyond a predetermined threshold are detected. Even if it is determined that the field-of-view of the flame detector still covers the predetermined area, it may be desirable to alert an operator and/or a control system to the detection of vibrations beyond a predetermined threshold, since vibrations may cause the flame detector to malfunction in other ways.

In embodiments, indicating means that indicate whether the field-of-view of the flame detector covers the predetermined area are arranged together with the at least one flame detector. Such indicating means may e.g. be arranged on the same housing as the flame detector, and may preferably be used as an aid during installation of the flame detector. In embodiments, the indicating means is a laser aiming device, that e.g. aims at the center of the field-of view of the flame detector. In other embodiments, the indicating means indicate how the flame detector should be oriented in order to cover a predetermined area. Such indicating means may e.g. be a number of LEDs and/or one or more arrows that indicate directions in which the flame detector should be turned in order to cover the desired field-of view. The indicating means may also be a combination of a laser aiming device and LEDs and/or arrows.

In embodiments, it is determined whether the field-of-view of the flame detector still covers the predetermined area. This determination may e.g. compare the signals received from the at least one movement sensor with stored orientation data representing the orientation of the at least one flame detector when it is arranged so that its field-of-view covers the predetermined area. This is a simple way of determining whether the field-of-view of the flame detector still covers the predetermined area.

In embodiments, the at least one movement sensor comprises at least one of an accelerometer, a gyroscope, an inertial measurement unit, and/or a direction sensing device, such as a compass. Based on the signals from at least one of these sensors, it may be determined whether the field-of-view of the flame detector still covers the predetermined area.

In embodiments, it is determined whether the field-of-view of the flame detector still covers the predetermined area only after first detecting abnormal movement of the flame detector. This saves on processing resources, since such a determination may be much more complicated than just detecting abnormal movement of the flame detector. Further, if the flame detecting arrangement comprises both a local processing device and a remote processing device in a control system, and the determination of whether the field-of-view of the flame detector still covers the predetermined area is made in the remote control system, it may be an advantage for the local processing device not to have to communicate with this remote control system until abnormal movement of the flame detector has been detected by the local processing device.

In embodiments, it is determined whether the field-of-view of the flame detector still covers the predetermined area using image processing software. Unless the flame detector is image based, this may require the flame detecting arrangement to comprise an image generating device.

That a device is "arranged together with the flame detector" according to this disclosure means that the device experiences the same movements as the flame detector. This may be accomplished by the device being arranged within the same housing as the flame detector, but it may also be accomplished by the device being mounted onto the flame detector housing, or just onto the same structure as the flame detector.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

When an optical flame detector has been arranged with its field-of-view covering an area where there is a fire hazard, there is no way of knowing that the surveilled area stays within the field-of-view of the flame detector. This may mean that the flame detector cannot be relied upon to safely monitor an area to be surveilled for the presence of flames. It is therefore important that an operator and/or a control system is alerted if abnormal movement of the flame detector has been detected.

The present disclosure relates generally to flame detecting arrangements and methods. Embodiments of the disclosed solution are presented in more detail in connection with the figures.

Figure 1:
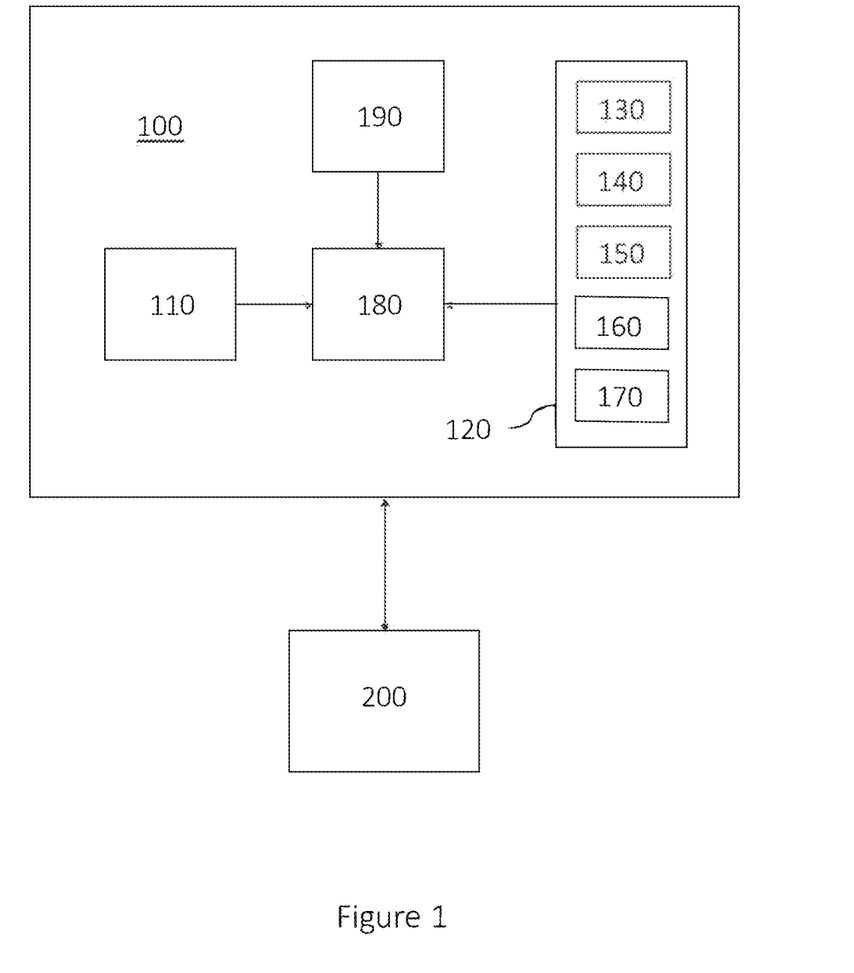
FIG. 1 schematically illustrates a flame detecting arrangement, in accordance with one or more embodiments described herein.

FIG. 1 schematically illustrates a flame detecting arrangement 100, in accordance with one or more embodiments described herein. The flame detecting arrangement 100 comprises at least one optical flame detector 110, at least one movement sensor 120, and at least one processing device. The at least one processing device may be a local processing device 180, arranged together with the flame detector 110, but it may also be a remote processing device, e.g. in a control system 200, or a combination of both. The at least one movement sensor 120 is arranged together with the at least one flame detector 110, so that it senses the same movement as the at least one flame detector 110. The at least one movement sensor 120 may e.g. be arranged within, or mounted onto, the same housing as the at least one flame detector 110. The flame detecting arrangement 100 may also comprise indicating means 190.

Figure 2:
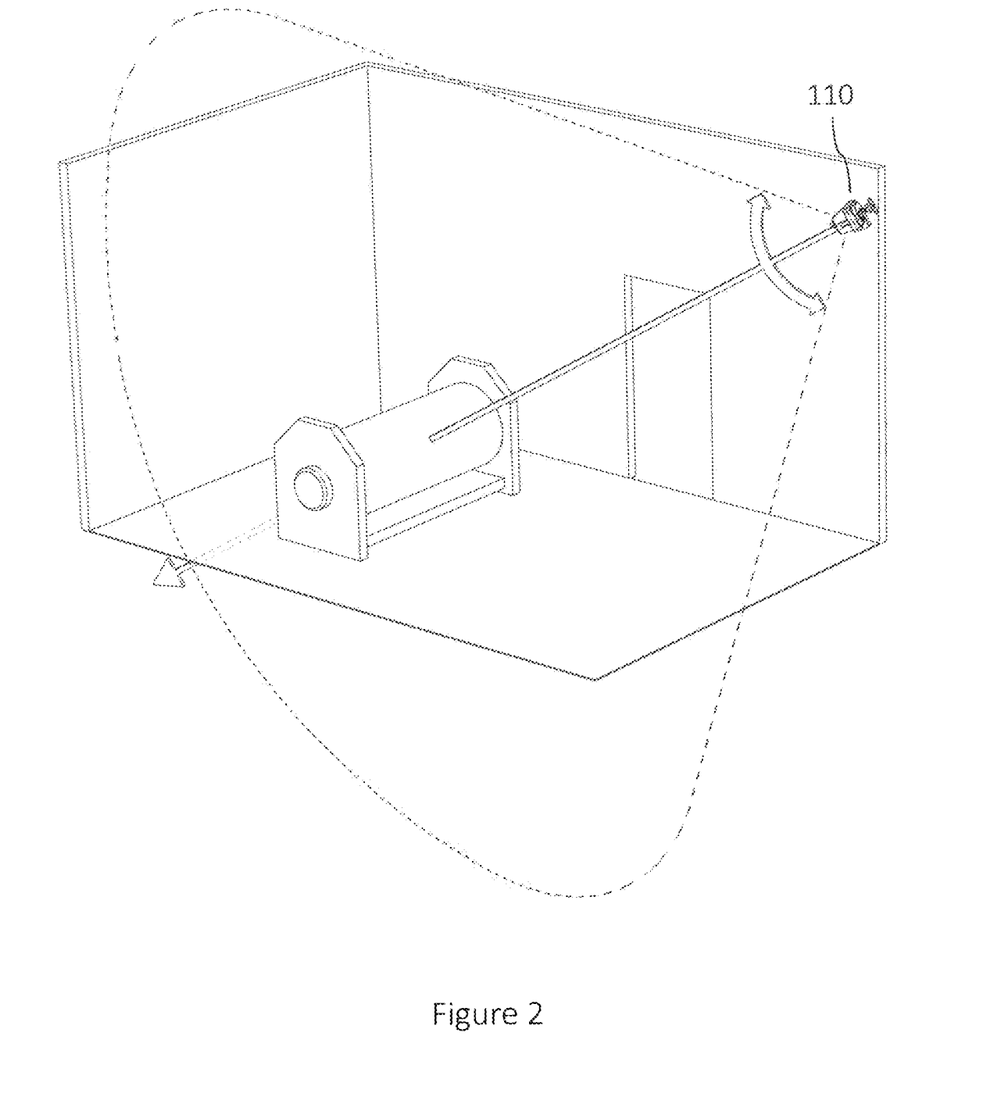
FIG. 2 schematically illustrates the monitoring of an area where there is a fire hazard, in accordance with one or more embodiments described herein.

During use, the at least one optical flame detector 110 is arranged with its field-of-view covering a predetermined area, as shown schematically in FIG. 2. The at least one optical flame detector 110 may e.g. be fixedly mounted in a position where its field-of-view covers an area where there is a fire hazard, such as e.g. a turbine enclosure, a generator room, a munitions facility, a battery room, a gas cabinet, an aircraft hangar, a fuel transfer station, a hydrogen storage and filling facility, a compressor station, a silane storage bunker, or a paint spray booth.

The at least one processing device 180 may be arranged to receive signals from the movement sensor 120, and detect abnormal movement of the flame detector 110 based on these signals. Abnormal movement of a flame detector 110 may e.g. be caused by people or equipment accidentally pushing the flame detector 110.

For outdoor mounted flame detectors 110, abnormal movement may also be caused by weather conditions, such as e.g. severe winds, waves, or earthquakes.

Since an optical flame detector 110 cannot be relied upon to safely monitor an area to be surveilled for the presence of flames unless its field-of-view covers the area where there is a fire hazard, it is important to inform any person or control system 200 relying on the flame detector 110 as soon as possible if abnormal movement of the flame detector has been detected. The at least one processing device 180 may therefore be arranged to alert an operator and/or a control system 200 if abnormal movement of the flame detector has been detected, in order to enable correction of the field-of-view of the flame detector to the desired, preferably the original, field-of-view.

The at least one optical flame detector 110 may e.g. be an ultraviolet flame detector (such as e.g. Omniguard® model 660), an infrared flame detector (such as e.g. Omniguard® model 760), or an ultraviolet-infrared flame detector (such as e.g. Omniguard® model 860).

Preferably, the at least one processing device is a local processing device 180 arranged together with the flame detector 110. Such a local processing device 180 may e.g. be arranged within, or mounted onto, the same housing as the at least one flame detector 110. If such a local processing device 180 is used, the signals from the at least one movement sensor 120 may be processed locally, so that there is no need to contact any control system 200 unless problems are detected. This enables the flame detecting arrangement to function as a stand-alone device, without any connection to any external system. However, if the local processing device 180 detects movement of the flame detector 110 beyond predetermined thresholds, a control system 200 should preferably be contacted. An operator may in that case be alerted through the control system 200, and/or through the local processing device 180, which may e.g. display an alert using the indicating means 190 on the flame detecting arrangement 110. In embodiments, signals from the flame detecting arrangement 100 may also be sent directly to a user device such as e.g. a mobile phone.

If a local processing device 180 is used, this enables the flame detecting arrangement 100 to be connected to any kind of system, since the signal from the flame detecting arrangement 100 in case of a detected abnormal movement in such a case may be very simple. This is advantageous, since there are in many countries standards that must be met for primary security functions such as fire alarm systems. Such standards may e.g. specify that the signal sent from a flame detecting arrangement 100 to a fire alarm must follow a certain international standard, such as e.g. being a relay output or a current output (4-20 mA) from a fire detecting arrangement 100. If a local processing device 180 is used, the flame detecting arrangement 100 may be arranged to provide any output needed to follow such a standard. The output from the flame detecting arrangement 100 could then also easily be received by any kind of control system 200.

The at least one movement sensor 120 may comprise a number of different sensors. In the embodiment shown in FIG. 1, the at least one movement sensor 120 comprises a vibration sensor 130, an accelerometer 140, a gyroscope 150, an inertial measurement unit 160, and a direction sensing device, such as a compass 170. Normally, the at least one movement sensor 120 would not comprise all of these sensors, but any combination of one or more sensors is conceivable.

If the at least one movement sensor 120 comprises a vibration sensor 130, the at least one processing device 180 may be arranged to receive signals from the vibration sensor 130, and detect abnormal movement of the flame detector 110 based on these signals. This allows for detecting any kind of abnormal movement of the flame detector 110, even e.g. a mild push or shake, which may have caused the field-of-view of the flame detector to no longer cover the predetermined area. The signals from the vibration sensor 130 may e.g. be evaluated over time, in order to e.g. be able to treat continuous movement differently from instantaneous movement. This may be done e.g. by integrating the signals from the vibration sensor 130, and/or determine the average value of the signals from the vibration sensor 130. If the flame detecting arrangement 100 is arranged in a non-static environment, such as on e.g. on an oil rig, there may be continuous movements caused by waves that do not affect the position and orientation of the flame detecting arrangement 100. If there are several flame detecting arrangements 100 in the same location, e.g. on the same oil rig, signals from the vibration sensors 130 of the different flame detecting arrangements 100 may be compared with each other in order to detect abnormal movement of one of the flame detectors 110.

The at least one processing device 180 may be arranged to alert an operator and/or a control system 200 if abnormal movement in the form of vibrations beyond a predetermined threshold are detected, even if it is determined that the field-of-view of the flame detector 110 still covers the predetermined area. It may be desirable to alert an operator and/or a control system 200 to the detection of vibrations beyond a predetermined threshold, since vibrations may cause the flame detector 110 to malfunction. Such a threshold may also be defined as a range within which vibrations are acceptable, especially if the flame detecting arrangement 100 is arranged in a non-static environment, such as e.g. on an oil rig. There may be an option to define such a range, e.g. during installation of the flame detector 110, or via a control system 200 at a later stage. The range may also be defined by training the system through e.g. recording the vibrations over a certain time span, such as e.g. one hour, 24 hours, or a week, and setting the range based on defining all vibrations detected during this time span as normal movement.

The at least one processing device 180 may be arranged to determine whether the field-of-view of the flame detector 110 still covers the predetermined area.

If the at least one movement sensor 120 comprises an accelerometer 140, the at least one processing device 180 may be arranged to determine whether the field-of-view of the flame detector 110 still covers the predetermined area based at least on signals received from the accelerometer 140. An accelerometer 140 is a compact device designed to measure non-gravitational acceleration. When an accelerometer 140 goes from a standstill to any velocity, it is designed to respond to the vibrations associated with such movement. It uses microscopic crystals that go under stress when vibrations occur, and from that stress a voltage is generated to create a reading on any acceleration. A threeaxis accelerometer 140 may be used to identify orientation, and thereby determine whether the orientation has changed from the orientation when the at least one flame detector 110 was arranged with its field-of-view covering the predetermined area.

If the at least one movement sensor 120 comprises a gyroscope 150, the at least one processing device 180 may be arranged to determine whether the field-of-view of the flame detector 110 still covers the predetermined area based at least on signals received from the gyroscope 150. A gyroscope 150 is a device that uses gravity to help determine orientation. Its design consists of a freely-rotating disk called a rotor, mounted onto a spinning axis in the center of a larger and more stable wheel. As the axis turns, the rotor remains stationary to indicate the central gravitational pull. Since a gyroscope 150 determines orientation, it may be used to determine whether the orientation has changed from the orientation when the at least one flame detector 110 was arranged with its field-of-view covering the predetermined area.

If the at least one movement sensor 120 comprises an inertial measurement unit 160, the at least one processing device 180 may be arranged to determine whether the field-of-view of the flame detector 110 still covers the predetermined area based at least on signals received from the inertial measurement unit 160. An inertial measurement unit (IMU) 160 is an electronic device that measures and reports a body's specific force and angular rate using a combination of accelerometers and gyroscopes. Since an inertial measurement unit 160 determines orientation, it may be used to determine whether the orientation has changed from the orientation when the at least one flame detector 110 was arranged with its field-of-view covering the predetermined area.

If the at least one movement sensor 120 comprises a direction sensing unit such as a compass 170, the at least one processing device 180 may be arranged to determine whether the field-of-view of the flame detector 110 still covers the predetermined area based at least on signals received from the compass 170. Since a compass 170 determines orientation, it may be used to determine whether the orientation has changed from the orientation when the at least one flame detector 110 was arranged with its field-of-view covering the predetermined area. If it is desired to determine changes from an absolute compass direction, the compass 170 is preferably calibrated after installation of the flame detecting arrangement 100, since deviation caused local magnetic fields may affect the compass 170.

The flame detecting arrangement 100 may also comprise indicating means 190 that indicate whether the field-of-view of the flame detector 110 covers the predetermined area. Such indicating means 190 are preferably arranged together with the flame detector 110, e.g. by being arranged on the same housing as the flame detector 110. The indicating means 190 may e.g. be a laser aiming device, that e.g. aims at the center of the field-of view of the flame detector 110. This enables the person installing the flame detector 110 to see where the center of the field-of view of the flame detector 110 will be. This may be very useful as an aid during installation of the flame detector 110, but it may also be used during redirection of the flame detector 110 after an alert that the field-of view of the flame detector 110 may no longer cover the predetermined area.

In some situations, the position and orientation of the flame detector 110 may be pre-planned. If a new facility is planned for construction, the desired positions and orientations of flame detectors 110 may be pre-planned and specified in e.g. 3D drawings of the facility, so that the field-of-view of each flame detector 110 covers a relevant area where there is a fire hazard. In such situations, the pre-planned position and orientation may be pre-programmed into the at least one processing device 180 of the flame detecting arrangement 100. If the flame detecting arrangement 100 comprises indicating means 190 in the form of e.g. a number of LEDs or one or more arrows, these could be used to indicate to the person making the installation how the flame detector 110 should be moved in order to be placed in the pre-planned position and orientation. Such indicating means 190 may also be used during redirection of the flame detector 110 after an alert that the field-of view of the flame detector 110 may no longer cover the predetermined area.

In order to determine whether the field-of-view of the flame detector 110 still covers the predetermined area, it is advantageous to during installation of the flame detector 110 store orientation data representing the orientation of the flame detector 110 when it is arranged with its field-of-view covering the predetermined area, so that the signals from the accelerometer 140, gyroscope 150, inertial measurement unit 160, and/or compass 170 may be compared with these stored orientation data. Such a comparison may determine deviations that are larger than a predetermined amount from the stored orientation data, or it may determine deviations outside of a predetermined range set in relation to the stored orientation data. There may be an option to define such a range, e.g. during installation of the flame detector 110, or via a control system 200 at a later stage. The range may also be defined by training the system through e.g. recording the movement over a certain time span, such as e.g. one hour, 24 hours, or a week, and setting the range based on defining all movement detected during this time span as normal movement.

The at least one processing device 180 may be arranged to only determine whether the field-of-view of the flame detector 110 still covers the predetermined area after first detecting abnormal movement of the flame detector 110.

The at least one processing device 180 may be arranged to determine whether the field-of-view of the flame detector 110 still covers the predetermined area using image processing software. Unless the flame detector 110 is image based, this may require the flame detecting arrangement 100 to comprise an image generating device.

Figure 3:
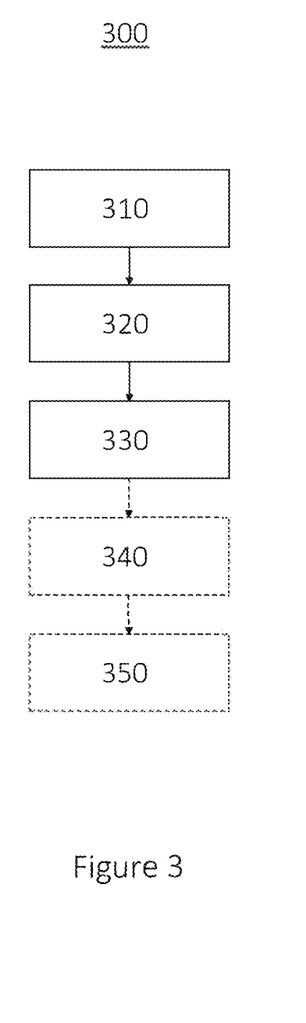
FIG. 3 schematically illustrates a method for a flame detector arranged with its field-of-view covering a predetermined area, in accordance with one or more embodiments described herein.

FIG. 3 schematically illustrates a method 300 for an optical flame detector 110 arranged with its field-of-view covering a predetermined area. The method 300 may comprise:

Step 310: receiving signals from a movement sensor 120 arranged together with the flame detector 110 in a processing device 180 arranged together with the flame detector 110.

Step 320: detecting abnormal movement of the flame detector 110 based on these signals.

Step 330: alerting an operator and/or a control system 200 if abnormal movement of the flame detector 110 has been detected.

Use of the method 300 allows for informing an operator/control system 200 if there is a risk that the field-of-view of the flame detector 110 to no longer covers the area where there is a fire hazard, so that the field-of-view of the flame detector can be corrected to the desired, preferably the original, field-of-view.

In embodiments, the at least one movement sensor 120 comprises a vibration sensor 130. In embodiments, the receiving 310 comprises receiving signals from the vibration sensor 130, the detecting 320 comprises detecting abnormal movement of the flame detector 110 based on these signals, and the alerting 330 comprises alerting an operator and/or a control system 200 if abnormal movement in the form of vibrations beyond a predetermined threshold are detected. This allows for detecting any kind of abnormal movement of the flame detector, even e.g. a mild push or shake, which may have caused the field-of view of the flame detector to no longer cover the predetermined area.

In embodiments, the at least one movement sensor 120 comprises at least one of: an accelerometer 140; a gyroscope 150; an inertial measurement unit 160; and/or a direction sensing unit such as a compass 170.

The method 300 may further comprise one or more of:

Step 340: indicating, using indicating means 190 arranged together with the at least one flame detector 110, whether the field-of-view of the flame detector 110 covers the predetermined area.

Step 350: determining whether the field-of-view of the flame detector 110 still covers the predetermined area.

The determining 350 of whether the field-of-view of the flame detector 110 still covers the predetermined area may be based at least on the signals received from the at least one movement sensor 120.

In embodiments, the determining 350 of whether the field-of-view of the flame detector 110 still covers the predetermined area compares the signals received from the at least one movement sensor 120 with stored orientation data representing the orientation of the at least one flame detector 110 when it is arranged with its field-of-view covering the predetermined area. This is a simple way of determining whether the field-of-view of the flame detector still covers the predetermined area.

In embodiments, the determining 350 of whether the field-of-view of the flame detector 110 still covers the predetermined area takes place only after first detecting 320 abnormal movement of the flame detector.

In embodiments, the determining 350 of whether the field-of-view of the flame detector 110 still covers the predetermined area uses image processing software. Unless the flame detector 110 is image based, this may require the flame detecting arrangement 100 to comprise an image generating device.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A flame detecting arrangement comprising:
at least one optical flame detector, arranged with its field-of-view covering a predetermined area;
indicating means, arranged together with the at least one flame detector;
at least one movement sensor, arranged together with the at least one flame detector; and
at least one processing device, arranged together with the at least one flame detector, to:
  receive signals from the movement sensor;
  detect abnormal movement of the flame detector based on these signals;
  alert an operator and/or a control system if abnormal movement of the flame detector has been detected; and
  indicate, using the indicating means, directions in which the at least one flame detector should be turned in order to be placed in a pre-planned position and orientation in order for its field-of-view to cover the predetermined area.

2. The flame detecting arrangement according to claim 1, wherein the at least one movement sensor comprises a vibration sensor, and the at least one processing device is arranged to:
receive signals from the vibration sensor, and detect abnormal movement of the flame detector based on these signals; and
alert an operator and/or a control system if abnormal movement in the form of vibrations beyond a predetermined threshold are detected.

3. The flame detecting arrangement according to claim 1, wherein the at least one processing device is arranged to determine whether the field-of-view of the flame detector still covers the predetermined area.

4. The flame detecting arrangement according to claim 3, wherein the at least one processing device is arranged to determine whether the field-of-view of the flame detector still covers the predetermined area by comparing the signals received from the movement sensor with stored orientation data representing the orientation of the at least one flame detector when it is arranged with its field-of-view covering the predetermined area.

5. The flame detecting arrangement according to claim 3, wherein the at least one processing device is arranged to determine whether the field-of-view of the flame detector still covers the predetermined area only after first detecting abnormal movement of the flame detector.

6. The flame detecting arrangement according to claim 3, wherein the at least one processing device is arranged to use image processing software in order to determine whether the field-of-view of the flame detector still covers the predetermined area.

7. The flame detecting arrangement according to claim 1, wherein the at least one movement sensor comprises at least one of:
an accelerometer;
a gyroscope;
an inertial measurement unit; and/or
a direction sensing device, such as a compass; and
wherein the at least one processing device is arranged to determine whether the field-of-view of the flame detector still covers the predetermined area based at least on signals received from the at least one movement sensor.

8. A method for an optical flame detector arranged with its field-of-view covering a predetermined area, the method comprising:
receiving signals from a movement sensor arranged together with the flame detector in a processing device arranged together with the flame detector;
detecting abnormal movement of the flame detector based on these signals;
alerting an operator and/or a control system if abnormal movement of the flame detector has been detected; and
indicating, using indicating means arranged together with the at least one flame detector, directions in which the at least one flame detector should be turned in order to be placed in a pre-planned position and orientation in order for its field-of-view to cover the predetermined area.

9. The method according to claim 8, wherein the at least one movement sensor comprises a vibration sensor, the receiving comprises receiving signals from the vibration sensor, the detecting comprises detecting abnormal movement of the flame detector based on these signals, and the alerting comprises alerting an operator and/or a control system if abnormal movement in the form of vibrations beyond a predetermined threshold are detected.

10. The method according to claim 8, further comprising determining whether the field-of-view of the flame detector still covers the predetermined area.

11. The method according to claim 10, further comprising determining whether the field-of-view of the flame detector still covers the predetermined area by comparing the signals received from the at least one movement sensor with stored orientation data representing the orientation of the at least one flame detector when it is arranged with its field-of-view covering the predetermined area.

12. The method according to claim 10, further comprising determining whether the field-of-view of the flame detector still covers the predetermined area only after first detecting abnormal movement of the flame detector.

13. The method according to claim 10, further comprising determining whether the field-of-view of the flame detector still covers the predetermined area using image processing software.

14. The method according to claim 8, wherein the at least one movement sensor comprises at least one of:
  an accelerometer;
  a gyroscope;
  an inertial measurement unit; and/or
  a direction sensing device, such as a compass; and
  wherein the method further comprises determining whether the field-of-view of the flame detector still covers the predetermined area based at least on the signals received from the at least one movement sensor.

15. A flame detecting arrangement comprising:
  at least one optical flame detector, arranged with its field-of-view covering a predetermined area;
  indicating means, arranged together with the at least one flame detector;
  at least one movement sensor, arranged together with the at least one flame detector; and
  at least one processing device, arranged together with the at least one flame detector, to:
    receive signals from the movement sensor;
    detect abnormal movement of the flame detector based on these signals;
    alert an operator and/or a control system if abnormal movement of the flame detector has been detected; and
    indicate, using the indicating means, directions in which the at least one flame detector should be turned in order for its field-of-view to cover the predetermined area,
  wherein indicating means includes a number of LEDs or one or more arrows.

16. A method for an optical flame detector arranged with its field-of-view covering a predetermined area, the method comprising:
  receiving signals from a movement sensor arranged together with the flame detector in a processing device arranged together with the flame detector;
  detecting abnormal movement of the flame detector based on these signals;
  alerting an operator and/or a control system if abnormal movement of the flame detector has been detected; and
  indicating, using indicating means arranged together with the at least one flame detector, directions in which the at least one flame detector should be turned in order for its field-of-view to cover the predetermined area,
  wherein indicating means includes a number of LEDs or one or more arrows.

\* \* \* \* \*